United States Patent
Wang

(10) Patent No.: US 8,186,639 B2
(45) Date of Patent: May 29, 2012

(54) BRACKET FOR TABLET ELECTRONIC DEVICE

(76) Inventor: Chin-Yang Wang, Shulin (TW)

( * ) Notice: Subject to any disclaimer, the term of this patent is extended or adjusted under 35 U.S.C. 154(b) by 0 days.

(21) Appl. No.: 12/926,243

(22) Filed: Nov. 4, 2010

(65) Prior Publication Data

US 2012/0001045 A1 Jan. 5, 2012

(30) Foreign Application Priority Data

Jun. 30, 2010 (TW) .............................. 99212396 U

(51) Int. Cl.
*A47B 97/04* (2006.01)

(52) U.S. Cl. ...................... 248/371; 248/163.1; 248/415

(58) Field of Classification Search .................. 248/370, 248/371, 393, 395, 163.1, 188.1, 188.6, 188.8, 248/166, 167, 415, 418, 276.1, 460, 462, 248/463, 464
See application file for complete search history.

(56) References Cited

U.S. PATENT DOCUMENTS

| | | | | | |
|---|---|---|---|---|---|
| 2,464,031 | A | * | 3/1949 | Fiedel | 248/167 |
| 4,105,176 | A | * | 8/1978 | Hill et al. | 248/676 |
| 5,253,840 | A | * | 10/1993 | Sheremetta | 248/452 |
| 6,695,268 | B1 | * | 2/2004 | Hsieh | 248/188.7 |
| 7,568,668 | B2 | * | 8/2009 | Taekema et al. | 248/166 |
| 7,980,737 | B2 | * | 7/2011 | Hu | 362/382 |
| 8,020,818 | B2 | * | 9/2011 | Chou et al. | 248/176.1 |
| 2007/0096002 | A1 | * | 5/2007 | Knight | 248/460 |
| 2009/0140119 | A1 | * | 6/2009 | To et al. | 248/455 |

* cited by examiner

*Primary Examiner* — Terrell McKinnon
*Assistant Examiner* — Steven Marsh
(74) *Attorney, Agent, or Firm* — Bacon & Thomas, PLLC

(57) ABSTRACT

The present invention is to provide a bracket, which comprises a main body having a first end with two sides horizontally pivoted to a first end of a horizontal support element respectively and a second end vertically pivoted to a first end of a vertical support element, so that a second end of each of the horizontal support elements can be opened away from each other and a second end of the vertical support element can be extended to an inclined angle away from the horizontal support elements. Thus, when lower surfaces of the two horizontal support elements are placed on a plane (such as a desk surface), a user can place a table electronic device stably on a virtual inclined support plane formed between the vertical and horizontal support elements.

10 Claims, 4 Drawing Sheets

BRACKET FOR TABLET ELECTRONIC DEVICE

FIELD OF THE INVENTION

The present invention relates to a bracket for an electronic device, and more particularly to a bracket for a tablet electronic device.

BACKGROUND OF THE INVENTION

Recently, with the development of fabrication technologies of electronic devices, the manufacture cost of various electronic devices is gradually lowered and the appearance design thereof is more compact day by day. Furthermore, there is a trend to increase multi-function designs of each of the electronic devices. For example, the current tablet electronic devices, including tablet computers, PDAs, mobile phones, digital photo frames and etc., not only have common functions of data input, storage, calculation, communication or image display, but also can provide additional functions of E-book and multi-media playing. Therefore, each of the tablet electronic devices has various advantages including lower price, diversified functions and compact volume, and thus has been widely used in human life nowadays.

Generally, when a user uses each of the foregoing tablet electronic devices to execute a function of E-book or multi-media playing, the user continuously holds a main body of the tablet electronic device by hands and adjusts the inclined angle of the main body by rotating arms or wrists, so that the user can face a display screen of the main body to view images shown on the display screen. At this time, for avoiding the main body and the display screen from being vibrated due to relaxation or carelessness of the arms or wrists of the user which causes the user unable to stably and concentratively view the images and affects the mood for viewing the images or generates the problem of eye fatigue and visual impairment, the user must continuously and tightly hold the main body to prevent the main body from be vibrated during viewing the images. As a result, the holding behavior of the user generally causes tight and stiff discomfort of hand muscles.

As described above, to solve the foregoing problems, a related manufacturer develops a bracket for a tablet electronic device. Referring now to FIG. 1, the bracket 1 comprises a first support plate 11 and a second support plate 12, wherein a front side of the first support plate 11 has a position close to a bottom edge and formed with a bearing portion 13, while the second support plate 12 is pivotally connected to a position close to a center of a rear side of the first support plate 11, so that the first support plate 11 and the second support plate 12 can be opened to include a predetermined angle (such as 70 degree) therebetween or be closed to each other. Thus, the user can firstly open the first support plate 11 and the second support plate 12 to stand the bracket 1 on a plane (such as a desk surface), wherein an inclined angle (such as 55 degree) is included between the first support plate 11 and the plane. After this, the user can place a tablet electronic device 14 on the bearing portion 13 of the first support plate 11, wherein the tablet electronic device 14 obliquely abuts against the first support plate 11. At this time, the user can easily view images shown on a display screen 140 on a front side of the tablet electronic device 14 without continuously holding the tablet electronic device 14 to prevent it from being vibrated due to hand behaviors of the user. Moreover, when the user don't need to use the bracket 1, the user can close the first support plate 11 and the second support plate 12 to each other again, so as to reduce the volume of the bracket 1 to be a plate like body. As a result, the user can conveniently store and carry the bracket 1.

However, according to market surveys, there are still some shortcomings existing in the actual use of the bracket 1 described as follows:

(1) When the first support plate 11 and the second support plate 12 of the bracket 1 are closed to each other, the volume of the bracket 1 only can be narrowed into a plate-like shape and can not be further narrowed. Thus, when the user stores the bracket 1, the user not only can't easily place the bracket 1 into his/her pocket for carrying it, but also must place the bracket 1 in a bag for carrying it, resulting in the inconvenience and troubles for the user during using the bracket 1; and (2) When the user opens the first support plate 11 and the second support plate 12 of the bracket 1 and stands the bracket 1 on the plane (such as a desk surface) by the first support plate 11 and the second support plate 12, only a fixed inclined angle (such as 55 degree) is included between the first support plate 11 and the plane, and the inclined angle can not be varied according to individual need of the user. Thus, when the user places the tablet electronic device 14 on the bracket 1 for viewing the images showed on the display screen 140 of the tablet electronic device 14, the user must inconveniently adjust the body posture (such as hunched over posture) thereof to match the images showed on the display screen 140 in the fixed inclined angle, resulting in causing the pain problems of the neck and back of the user.

As a result, it is important for bracket designers to think how to improve and design a bracket to be conveniently carried and adjusted its inclined angle according to individual need of the user during the bracket supports an tablet electronic device, in order to solve the foregoing problems existing in the conventional bracket, as described above.

It is therefore tried by the inventor to develop a bracket for a tablet electronic device to solve the problems existing in the conventional bracket that can not be folded to narrow its volume and can not adjust the inclined angle in relation to a tablet electronic device (such as tablet computer, PDA, mobile phone, digital photo frame and etc.), as described above.

SUMMARY OF THE INVENTION

A primary object of the present invention is to provide a bracket for a tablet electronic device, which comprises a main body having a first end and a second end, wherein the first end of the main body has two sides pivotally connected to a first end of a horizontal support element, respectively, so that a second end of each of the two horizontal support elements can be opened away from each other or can be closed to each other along a horizontal direction corresponding to two sides of the main body. Each of the two horizontal support elements has an upper surface formed with at least one positioning recess. In addition, the second end of the main body is further pivotally connected to a first end of a vertical support element, and a second end of the vertical support element can be extended to an inclined angle (such as 70 degree) toward a direction away from the horizontal support elements or can be folded toward a direction closed to the horizontal support elements. Therefore, when a user opens each of the two horizontal support elements away from each other along the horizontal direction corresponding to the two sides of the main body and extends the vertical support element toward the direction away from the second end of the main body, the bracket can be formed with a virtual inclined support plane thereon. Thus, when a lower surface of the two horizontal support elements of the bracket is placed on a plane (such as a desk surface), the user can place a table electronic device on the bracket, wherein a lower edge of the table electronic device will be inserted and positioned into the at least two opposite positioning recesses of the two horizontal support elements, so that the table electronic device will be stably positioned on the virtual inclined support plane. As a result, the user can easily view images showed on a display screen on a front side of the table electronic device without continuously holding the table electronic device. In addition, when the user wants to adjust an inclined angle of the table electronic device, the user only needs to adjust the inclined angle of the vertical support element or adjust a relative position of the table electronic device inserted and positioned into each of the two horizontal support elements for the purpose of finishing adjusting the inclined angle of the table electronic device. Besides, when the bracket is not used, the user also can easily close the two horizontal support elements of the bracket to each other and fold the vertical support element toward a direction close to the main body for the purpose of narrowing the volume of the bracket to be a column-like shape, so that the user can conveniently store and carry the bracket.

A secondary object of the present invention is to provide a bracket for a tablet electronic device, wherein two opposite surfaces of the two horizontal support elements have a first connection portion and a second connection portion, respectively. Thus, when the two horizontal support elements are closed to each other, the two horizontal support elements can be stably connected to each other by the first connection portion and the second connection portion.

A third object of the present invention is to provide a bracket for a tablet electronic device, wherein a lower surface of each of the two horizontal support elements is provided with a first slip-resistant portion, while an upper surface of the vertical support element is provided with a second slip-resistant portion. Thus, the bracket not only can be stably placed on the plane by the two first slip-resistant portions on the lower surfaces the two horizontal support elements, but also can efficiently prevent the tablet electronic device from being dropped down from the bracket by the second slip-resistant portion o the upper surface of the vertical support element.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings.

Figure 1:
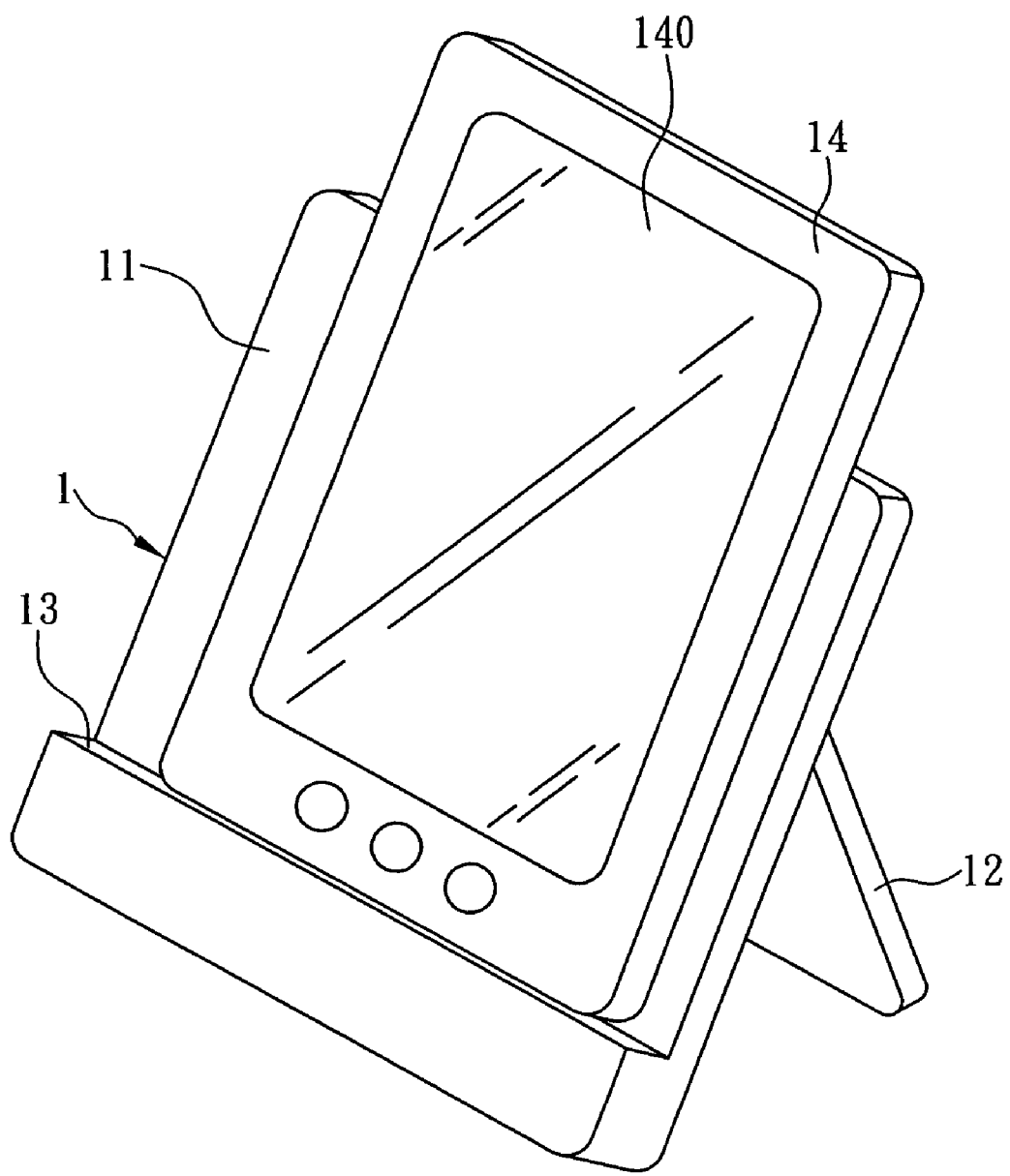
FIG. 1 is a schematic view of a traditional bracket for a tablet electronic device.
Figure 2:
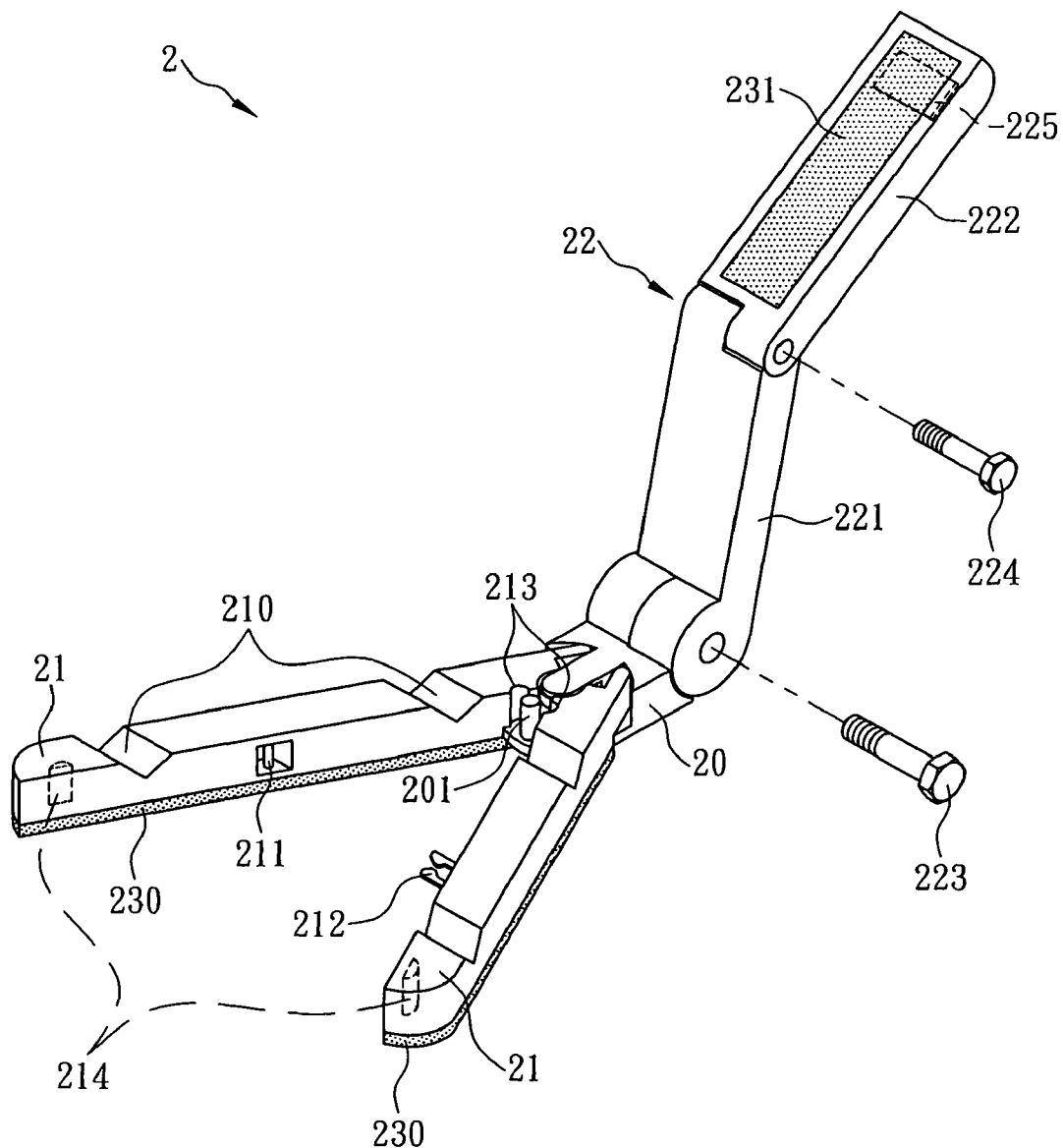
FIG. 2 is a schematic view of a bracket for a tablet electronic device according to a preferred embodiment of the present invention.

The present invention is a bracket for a tablet electronic device. Referring now to FIG. 2, in a preferred embodiment of the present invention, a bracket 2 comprises a main body 20, two horizontal support elements 21 and a vertical support element 22, wherein a first end of each of the two horizontal support elements 21 is pivotally connected to two sides of a first end of the main body 20, respectively. Meanwhile, a second end of each of the two horizontal support elements 21 can be opened away from each other or can be closed to each other along a horizontal direction corresponding to two sides of the main body 20 in relation to a first circle center defined by the first end of the main body 20. Each of the two horizontal support elements 21 has an upper surface formed with at least one positioning recess 210. In addition, a first end of a vertical support element 22 is pivotally connected to the second end of the main body, and a second end of the vertical support element 22 can be extended to an inclined angle (such as 70 degree) toward a direction away from the horizontal support elements 21 or can be folded toward a direction closed to the horizontal support elements 21 in relation to a second circle center defined by the second end of the main body 20. The second circle center defined by the second end of the main body 20 and the first circle center defined by the first end thereof are orthogonally arranged to each other.

Figure 3:
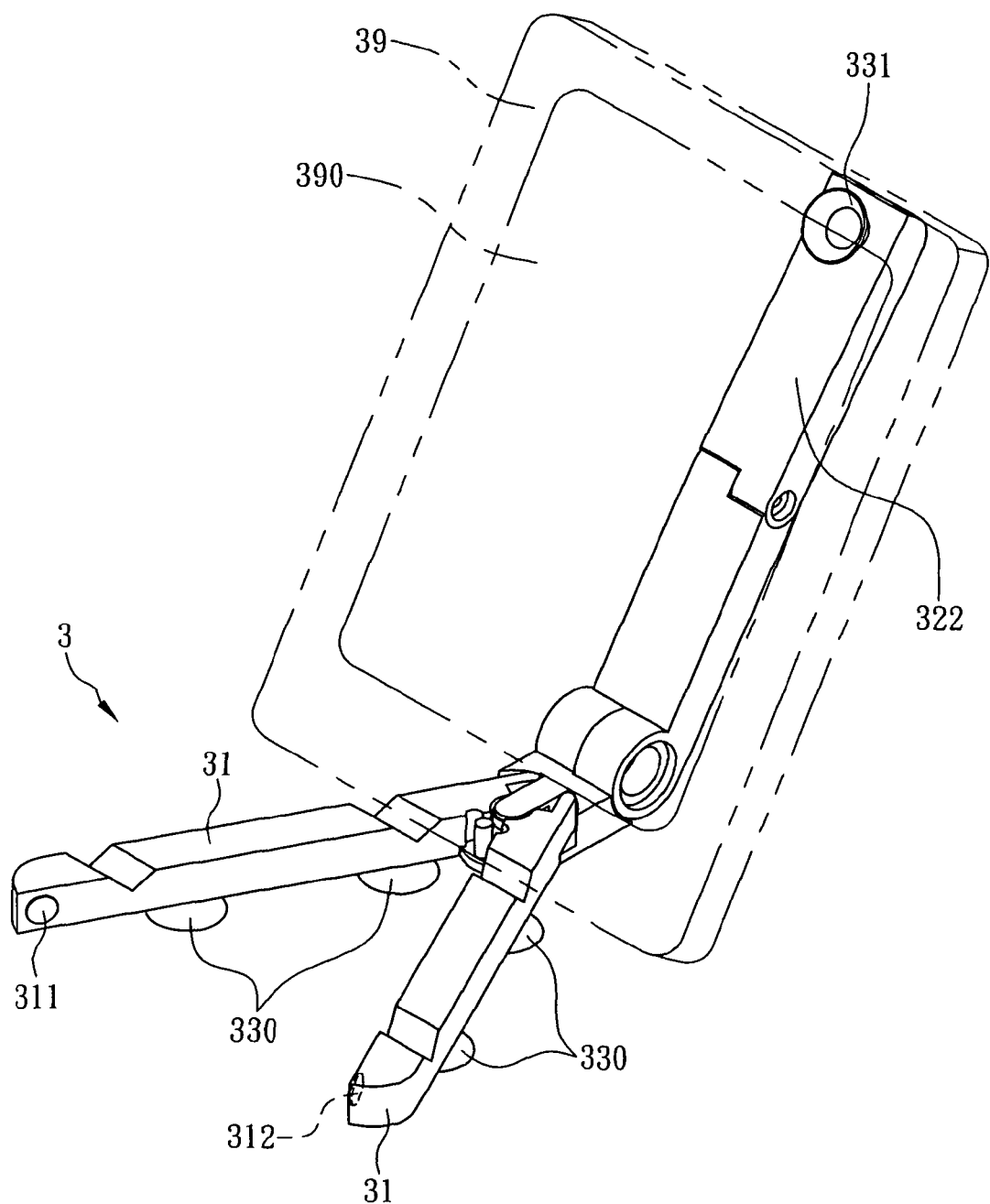
FIG. 3 is a schematic view of a bracket for a tablet electronic device according to another preferred embodiment of the present invention.
Figure 4:
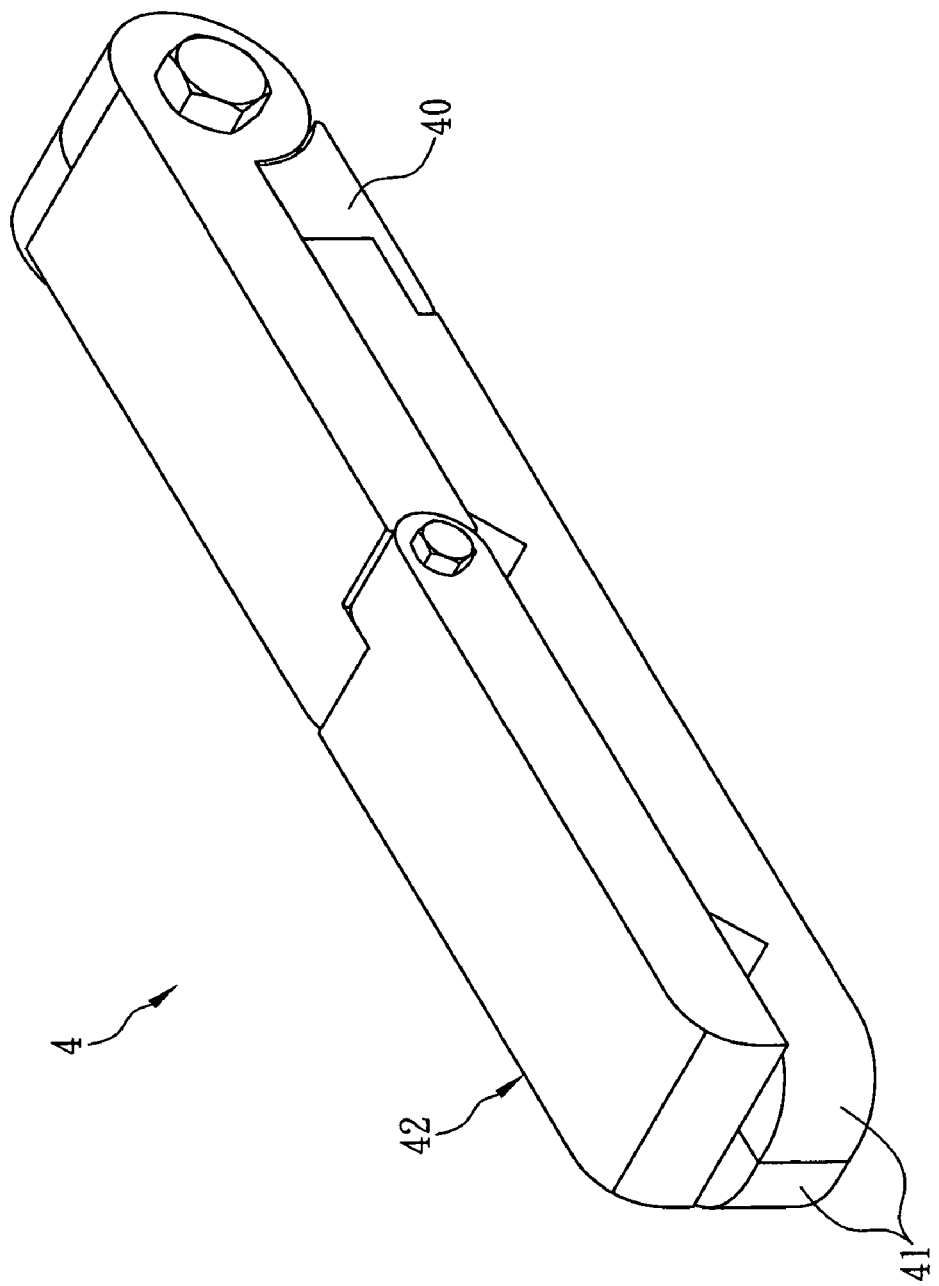
FIG. 4 is an operational view of the bracket for the tablet electronic device according to the present invention.

Therefore, when a user opens each of the two horizontal support elements 21 away from each other along the horizontal direction corresponding to the two sides of the main body 20, a first angle (such as 90 degree) can be defined between the two horizontal support elements 21, so that the at least two opposite positioning recesses 210 on the upper surface of the two horizontal support elements 21 can provide two horizontal support portions. After this, the user can extend the vertical support element 22 toward the direction away from the second end of the main body 20, so that a second angle (such as 90 degree) can be defined between the vertical support element 22 and the main body 20, and an upper surface of the second end of the vertical support element 22 can provide a virtual support portion. In this case, the two horizontal support portions and the virtual support portion commonly define a virtual inclined support plane. Thus, when a lower surface of the two horizontal support elements 21 of the bracket 2 is placed on a plane (such as a desk surface), the user can place a table electronic device 39 (such as tablet computer, PDA, mobile phone, digital photo frame and etc., as shown in FIG. 3) on the bracket 2, wherein two positions of a lower edge of the table electronic device 39 close to two sides thereof will be inserted and positioned into the at least two opposite positioning recesses 210 of the two horizontal support elements 21, while a rear surface of the table electronic device 39 is abutted against an upper surface of the vertical support element 22 close to the second end thereof. Thus, the table electronic device 39 will be stably positioned on the virtual inclined support plane. As a result, the user can easily and conveniently view images showed on a display screen 390 on a front side of the table electronic device 39 without continuously holding the table electronic device 39. In addition, when the user wants to adjust an inclined angle of the table electronic device 39, the user only needs to adjust the inclined angle of the vertical support element 22 or adjust a relative position of the table electronic device 39 inserted and positioned into each of the two horizontal support elements 21. For example, the two positions of the lower edge of the table electronic device 39 close to two sides thereof can be inserted and positioned into one set of opposite positioning recesses 210 of the two horizontal support elements 21 close to or away from the main body 20. Thus, the purpose of adjusting the inclined angle of the table electronic device 39 can be carried out. Besides, referring now to FIG. 4, when the bracket 4 is not used, the user also can easily close the two horizontal support elements 41 of the bracket 4 to each other and fold the vertical support element 42 toward a direction close to the main body 40 (i.e. toward a direction close to the closed horizontal support elements 41) for the purpose of narrowing the volume of the bracket 4 to be a column-like shape, so that the user can conveniently store and carry the bracket 4.

In the preferred embodiment, referring back to FIG. 2, the vertical support element 22 comprises a first support portion 221 and a second support portion 222, wherein a first end of the first support portion 221 is pivotally connected to the second end of the main body 20 through a first pivot 223, while a first end of the second support portion 222 is pivotally connected to a second end of the first support portion 221 through a second pivot 224. In addition, each of the first pivot 223 and the second pivot 224 is a pivotal axis capable of positioning or rotating each of the first support portion 221 and the second support portion 222. Thus, based on the pivotal structures of the first support portion 221, the second support portion 222, the first pivot 223 and the second pivot 224, the vertical support element 22 can be opened to various inclined angles, so that the user can adjust a desired inclined angle of the vertical support element 22 according to individual needs of the user.

Referring still to FIG. 2, in the preferred embodiment, each of the two horizontal support elements 21 is provided with a magnet 214 therein, while the second support portion 222 is provided with a magnetic metal plate 225 therein. Thus, when the user closes the two horizontal support elements 21 to each other, the two magnets 214 in the two horizontal support elements 21 can be attracted to each other, so that the two horizontal support elements 21 can be stably connected to each other. After this, when the user further folds the second support portion 222 toward the direction close to the two closed horizontal support elements 21, the magnetic metal plate 225 in the second support portion 222 can be attracted by the two magnets 214 in the two horizontal support elements 21, so that the second support portion 222 can be stably connected to the two horizontal support elements 21 by the magnetic metal plate 225. As a result, the user can conveniently store and carry the bracket 2.

Moreover, referring still to FIG. 2, two opposite sides of the two horizontal support elements 21 have a first connection portion and a second connection portion, respectively. For example, in the embodiment, the first connection portion is a first engagement element 211, and the second connection portion is a second engagement element 212, wherein the first engagement element 211 is matched with the second engagement element 212 and can be engaged with each other or separated from each other. Thus, in the state of closing the two horizontal support elements 21 to each other, the two horizontal support elements 21 can be stably connected to each other by the first engagement element 211 and the second engagement element 212. As a result, it can prevent the two horizontal support elements 21 from being easily separated from each other due to external vibrations or impacts after the two horizontal support elements 21 are closed to each other, so as to avoid to cause that the volume of the bracket 2 can not be efficiently narrowed and the user can not conveniently store the bracket 2. In addition, it should be noted that the first connection portion and the second connection portion are not limited to the first engagement element 211 and the second engagement element 212. Only if two suitable connection portions can be used to stably connect the two horizontal support elements 21 with each other during the two horizontal support elements 21 are closed to each other, the connection portions can be applied to the present invention. In an alternative embodiment, referring now to FIG. 3, the first connection portion and the second connection portion also can be selected from a first magnetic element 311 and a second magnetic element 312, both of which can be magnetically attracted to each other. Thus, when the user closes the two horizontal support elements 31, the two horizontal support elements 31 can be magnetically attracted and connected to each other by the first magnetic element 311 and the second magnetic element 312.

In addition, a lower surface of each of the two horizontal support elements 21 is provided with a first slip-resistant portion, while an upper surface of the second support portion 222 of the vertical support element 22 is provided with a second slip-resistant portion. For example, in the embodiment, each of the first slip-resistant portions is a first slip-resistant pattern 230, and the second slip-resistant portion is a second slip-resistant pattern 231. Because the first slip-resistant patterns 230 and the second slip-resistant pattern 231 can provide a slip-resistant function, the bracket 2 can increase the friction between the two horizontal support elements 21 and the plane by the first slip-resistant patterns 230 on the lower surfaces of the two horizontal support elements 21, so that the brackets can be stably placed on the plane. Furthermore, the bracket 2 can increase the friction between the second support portion 222 and the table electronic device 39 (as shown in FIG. 3) by the second slip-resistant pattern 231 on the upper surface of the second support portion 222 of the vertical support element 22, so as to efficiently prevent the table electronic device 39 from be separated from the bracket 2. In addition, it should be noted that the first slip-resistant portions and the second slip-resistant portion are not limited to the first slip-resistant patterns 230 and the second slip-resistant pattern 231. Only if suitable slip-resistant portions can be used to increase the friction or adhesion between the bracket 2 and the plane or the table electronic device 39, the slip-resistant portions can be applied to the present invention. In an alternative embodiment, referring now to FIG. 3, the first slip-resistant portions and the second slip-resistant portion also can be selected from two first suckers 330 and a second sucker 331. Thus, when the user places the bracket 3 on the plane, the two horizontal support elements 31 can be stably attached to the plane by the two first suckers 330. Meanwhile, when the user places the table electronic device 39 on the bracket 3, the table electronic device 39 can be stably attached to the second support portion 222 of the vertical support element by the second sucker 331 for carrying out the foregoing purposes.

In the embodiment, referring to FIG. 2 again, a center position of the first end of the main body 20 is extended to form a retaining element 201 toward a direction away from the second end of the main body 20, while each of the horizontal support elements 21 is provided with a retaining recess 213 corresponding to the retaining element 201, respectively. Therefore, when the user closes the two horizontal support elements 21 to each other, each of the horizontal support elements 21 can be retained on a position linearly aligned with the main body 20, respectively. As a result, after the two horizontal support elements 21 are closed to each other, it can prevent the two horizontal support elements 21 from being simultaneously shifted toward a left (or right) side of the main body 20 due to external vibrations or impacts, so as to avoid to cause that the volume of the bracket 2 can not be efficiently narrowed and the user can not conveniently store the bracket 2.

Therefore, as described above, referring still to FIG. 2, the bracket 2 of the present invention can use the two horizontal support elements 21 and the vertical support element 22, all of which can be adjust opened angles or can be folded, to solve various problems derived from the traditional bracket that can not efficiently narrow its volume and can not adjust the inclined angle of the table electronic device 39 (as shown in FIG. 3).

The present invention has been described with a preferred embodiment thereof and it is understood that many changes and modifications to the described embodiment can be carried out without departing from the scope and the spirit of the invention that is intended to be limited only by the appended claims.

What is claimed is:

1. A bracket for a tablet electronic device, comprising:
   a main body;
   two horizontal support elements, each of which has a first end pivotally connected to two sides of a first end of the main body, respectively, and a second end of each of the two horizontal support elements being opened away from each other or closed to each other along a horizontal direction corresponding to two sides of the main body in relation to a first circle center defined by the first end of the main body; wherein each of the two horizontal support elements has an upper surface formed with at least one positioning recess; and
   a vertical support element having a first end pivotally connected to a second end of the main body, and a second end of the vertical support element being extended to an inclined angle toward a direction away from the horizontal support elements or folded toward a direction closed to the horizontal support elements in relation to a second circle center defined by the second end of the main body; wherein the vertical support element includes
   a first support portion having a first end pivotally connected to the second end of the main body through a first pivot; and
   a second support portion having a first end pivotally connected to a second end of the first support portion through a second pivot and the second circle center defined by the second end of the main body and the first circle center defined by the first end thereof are orthogonally arranged to each other.

2. The bracket for a tablet electronic device according to claim 1, wherein two opposite sides of the two horizontal support elements have a first connection portion and a second connection portion, respectively, and the two horizontal support elements are stably connected to each other by the first engagement element and the second engagement element when closing the two horizontal support elements to each other.

3. The bracket for a tablet electronic device according to claim 1, wherein each of the two horizontal support elements is provided with a magnet therein, and wherein the two magnets in the two horizontal support elements are attracted to each other and thus the two horizontal support elements are stably connected to each other when the two horizontal support elements are closed to each other.

4. The bracket for a tablet electronic device according to claim 3, wherein the second support portion is provided with a magnetic metal plate therein, and wherein the second support portion is stably connected to the two horizontal support elements by the magnetic metal plate when the two horizontal support elements are closed to each other and the second support portion is folded toward the direction close to the two closed horizontal support elements.

5. The bracket for a tablet electronic device according to claim 1, wherein a center position of the first end of the main body is formed with a retaining element, while each of the horizontal support elements is provided with a retaining recess corresponding to the retaining element, respectively.

6. The bracket for a tablet electronic device according to claim 2, wherein a center position of the first end of the main body is formed with a retaining element, while each of the horizontal support elements is provided with a retaining recess corresponding to the retaining element, respectively.

7. The bracket for a tablet electronic device according to claim 4, wherein a center position of the first end of the main body is formed with a retaining element, while each of the horizontal support elements is provided with a retaining recess corresponding to the retaining element, respectively.

8. The bracket for a tablet electronic device according to claim 5, wherein a lower surface of each of the two horizontal support elements is provided with a first slip-resistant portion, while an upper surface of the vertical support element is provided with a second slip-resistant portion.

9. The bracket for a tablet electronic device according to claim 6, wherein a lower surface of each of the two horizontal support elements is provided with a first slip-resistant portion, while an upper surface of the vertical support element is provided with a second slip-resistant portion.

10. The bracket for a tablet electronic device according to claim 7, wherein a lower surface of each of the two horizontal support elements is provided with a first slip-resistant portion, while an upper surface of the vertical support element is provided with a second slip-resistant portion.

* * * * *